United States Patent
Anderson et al.

(10) Patent No.: US 7,967,320 B2
(45) Date of Patent: Jun. 28, 2011

(54) ATTACHMENT FOR A TRAILER HITCH BRACKET

(75) Inventors: Jed K. Anderson, Lindon, UT (US); Matthew C. Johnson, Lehi, UT (US)

(73) Assignee: Progress Mfg, Inc., Provo, UT (US)

( * ) Notice: Subject to any disclaimer, the term of this patent is extended or adjusted under 35 U.S.C. 154(b) by 536 days.

(21) Appl. No.: 12/072,805

(22) Filed: Aug. 24, 2007

(65) Prior Publication Data

US 2008/0238038 A1    Oct. 2, 2008

Related U.S. Application Data (60) Provisional application No. 60/861,622, filed on Nov. 27, 2006.

(51) Int. Cl.
*B60D 1/32* (2006.01)
*B62D 53/00* (2006.01)

(52) U.S. Cl. .................. 280/455.1; 280/405.1

(58) Field of Classification Search ........ 280/455.1, 280/405.1, 406.1, 406.2, 494; 188/196 P; 248/314, 562, 568, 569, 570, 580, 581, 602, 248/636, 687
See application file for complete search history.

(56) References Cited

U.S. PATENT DOCUMENTS

| | | | |
|---|---|---|---|
| 2,808,272 A * | 10/1957 | Reese | 280/406.2 |
| 3,194,584 A | 7/1965 | Reese | |
| 3,206,224 A * | 9/1965 | Bock et al. | 280/406.2 |
| 3,347,561 A * | 10/1967 | Hedgepeth | 280/406.2 |
| 3,380,757 A | 4/1968 | Sprout et al. | |
| 3,400,948 A | 9/1968 | Matson | |
| 3,403,928 A * | 10/1968 | Laughlin | 280/406.2 |
| 3,520,556 A * | 7/1970 | Warner | 280/406.2 |
| 3,542,395 A * | 11/1970 | Millikan | 280/406.2 |
| 3,552,771 A * | 1/1971 | Hendricks | 280/406.2 |
| 3,730,554 A | 5/1973 | Saunders | |
| 3,731,950 A * | 5/1973 | Burcham | 280/406.2 |
| 3,779,407 A * | 12/1973 | Gillem | 414/563 |
| 3,785,680 A | 1/1974 | Good et al. | |
| 3,801,133 A | 4/1974 | Thompson | |
| 3,861,717 A | 1/1975 | Knox | |
| 3,879,061 A | 4/1975 | Thompson | |
| 4,053,174 A * | 10/1977 | Guettler, Jr. | 280/406.2 |
| 4,165,885 A | 8/1979 | Good et al. | |
| 5,628,525 A * | 5/1997 | Kass et al. | 280/406.2 |
| 5,647,603 A * | 7/1997 | Kass et al. | 280/406.1 |
| D382,464 S * | 8/1997 | McCoy et al. | D8/373 |
| 5,799,965 A * | 9/1998 | Kass et al. | 280/406.1 |
| 5,868,414 A * | 2/1999 | McCoy et al. | 280/406.2 |
| 5,890,726 A * | 4/1999 | McCoy et al. | 280/406.1 |

(Continued)

*Primary Examiner* — Joanne Silbermann
*Assistant Examiner* — Daniel Yeagley
(74) *Attorney, Agent, or Firm* — Clayton, Howarth & Cannon P.C.

(57) ABSTRACT

An accessory for trailer hitch systems having components for equalizing loads and reducing trailer sway. The accessory includes a jacket for attaching to a bracket that supports a load equalizing spring bar. The bracket may include a lateral extending portion for supporting the spring bar. The jacket may include a socket for receiving the lateral extending portion of the bracket, such that the jacket may be removably installed on the bracket. The jacket may include a contact surface for contacting the spring bar. The contact surface may include a different coefficient of friction or a different shape, as compared to the lateral extending portion of the bracket, such that movement of the spring bar with respect to the bracket may be altered as compared to conditions in which the spring bar is supported on the bracket without the jacket.

8 Claims, 7 Drawing Sheets

U.S. PATENT DOCUMENTS

| | | | |
|---|---|---|---|
| 5,984,341 A * | 11/1999 | Kass et al. | 280/455.1 |
| 6,283,489 B1 | 9/2001 | Hoog | |
| 6,419,257 B1 | 7/2002 | McCoy et al. | |
| 6,746,036 B2 | 6/2004 | Adams | |
| 7,025,370 B2 * | 4/2006 | Anderson et al. | 280/405.1 |
| 2008/0122198 A1 * | 5/2008 | Anderson | 280/455.1 |
| 2008/0143078 A1 * | 6/2008 | McCoy et al. | 280/406.1 |
| 2008/0238038 A1 * | 10/2008 | Anderson et al. | 280/504 |
| 2008/0277903 A1 * | 11/2008 | Anderson et al. | 280/477 |
| 2009/0008904 A1 * | 1/2009 | Scott | 280/455.1 |

* cited by examiner

ATTACHMENT FOR A TRAILER HITCH BRACKET

CROSS-REFERENCE TO RELATED APPLICATIONS

This application claims the benefit of U.S. Provisional Application No. 60/861,622 filed Nov. 27, 2006, which is hereby incorporated by reference herein in its entirety, including but not limited to those portions that specifically appear hereinafter, the incorporation by reference being made with the following exception: In the event that any portion of the above referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to trailer hitch systems and accessories, and more particularly, but not necessarily entirely, to trailer hitch accessories for reducing sway of trailers.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often enhance the sway problem making driving even more stressful and difficult.

Another common problem encountered when towing a trailer is "highway hop," or the bouncing that often happens to trailers on uneven roadways. This problem may be caused by uneven weight distribution. With ordinary ball-type hitches, most of the trailer tongue weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer, and may be joined to the trailer tongue using chains and/or brackets. The end of the spring arms opposite the hitch head may be lifted or loaded to place an upward force on the hitch head to thereby equalize the load exerted on the trailer hitch. Various mechanisms are known for use in association with a trailer hitch to reduce side sway of the trailer as well as to equalize loads.

Some prior art embodiments of the brackets for joining the spring bars to the trailer tongue have been formed as rigid members, whereas other embodiments of the brackets have been formed as flexible members, such as chains. A drawback of the prior art brackets formed as flexible members is that the flexible members or chains may not provide stabilizing support to the spring bars and may allow the spring bars to swing back and forth in the manner of a pendulum.

Contact between the rigid brackets and the spring bars may help to reduce sway of the trailer. However, sometimes the contact between the spring bar and the brackets may cause noise. If the noise is excessive, or if increased maneuverability of the trailer is desired, it may be beneficial to reduce the friction between the spring bars and the rigid brackets. In other circumstances, it may be desirable to increase the friction between the spring bars and the rigid brackets to increase sway control.

Other trailer hitch systems are known to place a cam surface on the rigid brackets to modify movement of the spring bar with respect to the rigid bracket. For example, a convex cam surface may be formed on the bracket that interacts with a corresponding concave shape, or cam follower, on the spring bars. The shape of the cam surface on the bracket with respect to the cam follower on the spring bar may be configured to bias the spring bar in a neutral position with respect to the bracket, in which the cam follower mates with the cam. As the spring bar moves away from the neutral position in which the cam and cam follower are mated, the biasing force caused by the shapes of the cam and the cam follower tend to move spring bar back to the mated position on the bracket to thereby add stability to the trailer hitch system. Brackets having convex cam surfaces are disclosed in U.S. Pat. Nos. 3,194,584, 3,730,554 and 6,419,257, for example.

Despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structures and methods for providing a sway control hitch and accessories are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Figure 1:
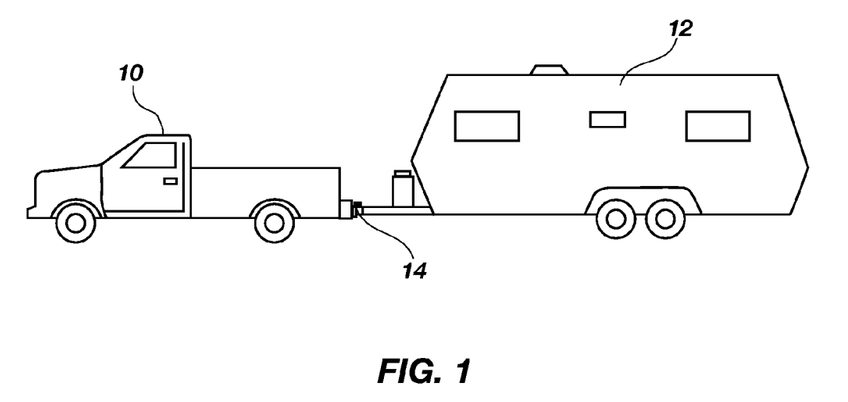
FIG. 1 is a side view of tow vehicle towing a trailer using a trailer hitch.

Referring now to FIG. 1, a side view is shown of a towing vehicle 10 towing a trailer 12 with a trailer hitch 14. It will be understood that the towing vehicle 10 may be any variety of vehicle known in the art, such as a truck, tractor or car, or any other variety of on-road or off-road vehicle, for example. Likewise, the principles of the present disclosure may be utilized with any variety of trailer 12 known in the art, such as camping trailers, boat trailers or cargo trailers, for example.

The load from the trailer 12 may tend to force the rear end of the towing vehicle 10 down and raise the front end of the towing vehicle 10. An uneven distribution of weight may make steering the towing vehicle 10 more difficult and may cause braking difficulties. Load equalizing systems, as part of the hitch 14 discussed more fully below, may be used to distribute the load created by the trailer 12 on the towing vehicle 10 to thereby make the trailer 12 and towing vehicle 10 more level, as shown in FIG. 1.

Figure 2:
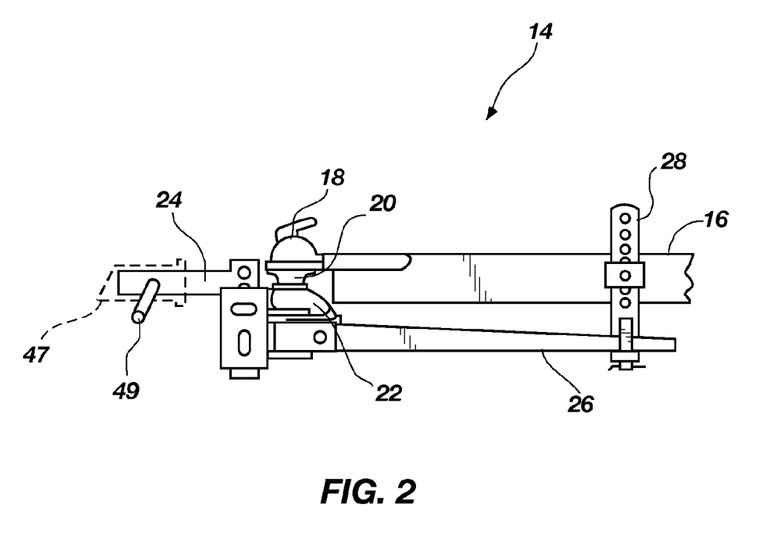
FIG. 2 is a side view of one embodiment of a trailer hitch attached to a break-away portion of a trailer tongue.

As shown in FIG. 2, which shows an enlarged view of the hitch 14 on break-away view of the trailer 12, the trailer 12 may include a tongue 16 extending at a forward end of the trailer 12. A coupler 18 may be located on an end of the tongue 16 for receiving a ball 20 of the hitch 14, in a manner known in the art. The ball 20 may be disposed on a hitch head 22 which may be attached to the tow vehicle 10 through a connector 24. A spring bar 26 may be joined to the hitch head 22 at one end, and to the trailer tongue 16 at an opposing end portion using a bracket 28. It will be understood that two spring bars 26 may be used, one on each side of the trailer 12.

The spring bars 26 may be configured to provide an upward force on the hitch head 22 to equalize the distribution of the load and allow the towing vehicle 10 and trailer 12 to be more level. The spring bars 26 may also be beneficial for reducing sway of the trailer 12.

Figure 3:
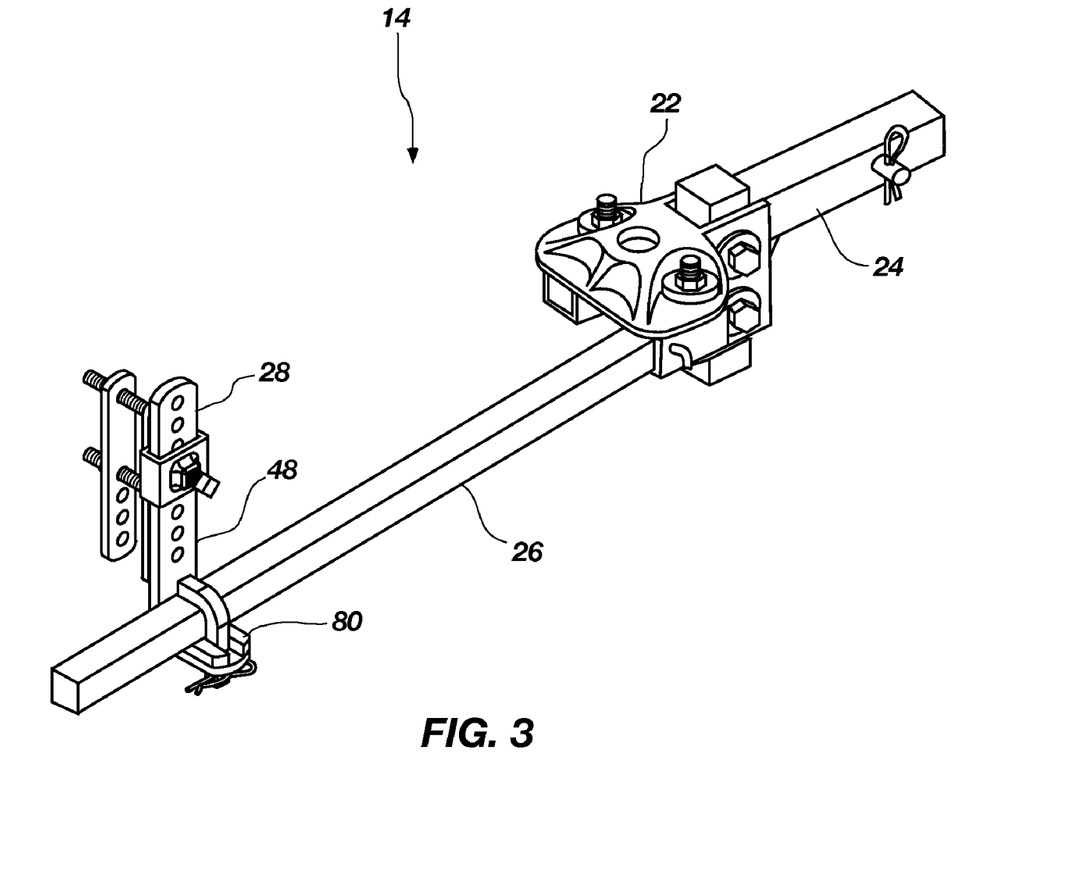
FIG. 3 is a perspective view of one embodiment of a trailer hitch and bracket jacket in accordance with the principles of the present disclosure.

Referring now to FIG. 3, a perspective view is shown of a portion of one embodiment of the hitch system, indicated generally at 14, in accordance with the principles of the present disclosure. It will be understood that the hitch system 14 may be attached to the tow vehicle 10 and trailer 12 as shown in FIG. 1. The hitch 14 may include the hitch head 22 for receiving the ball 20. It will be understood that the ball 20 may be attached to a trailer 12 in a manner known in the art. Similarly, the hitch 14 may include a connector 24 for attachment to a tow vehicle 10.

The hitch 14 may include spring bars 26 for applying an upward force on the hitch head 22 as discussed above. It will be understood that the spring bars 26 may be formed in various different configurations in accordance with the principles of the present disclosure. For example, one embodiment of the spring bars 26 may be formed of elongate members having a rectangular cross-sectional shape. The spring bars 26 may have a uniform configuration, or the spring bars 26 may have a tapered configuration such that the cross sectional area of the spring bars 26 may reduce along a length of the bars. An additional embodiment of the spring bars may be formed with a round cross-sectional shape. Moreover, it will be appreciated that the spring bars may have various other configurations within the scope of the present disclosure.

Figure 4:
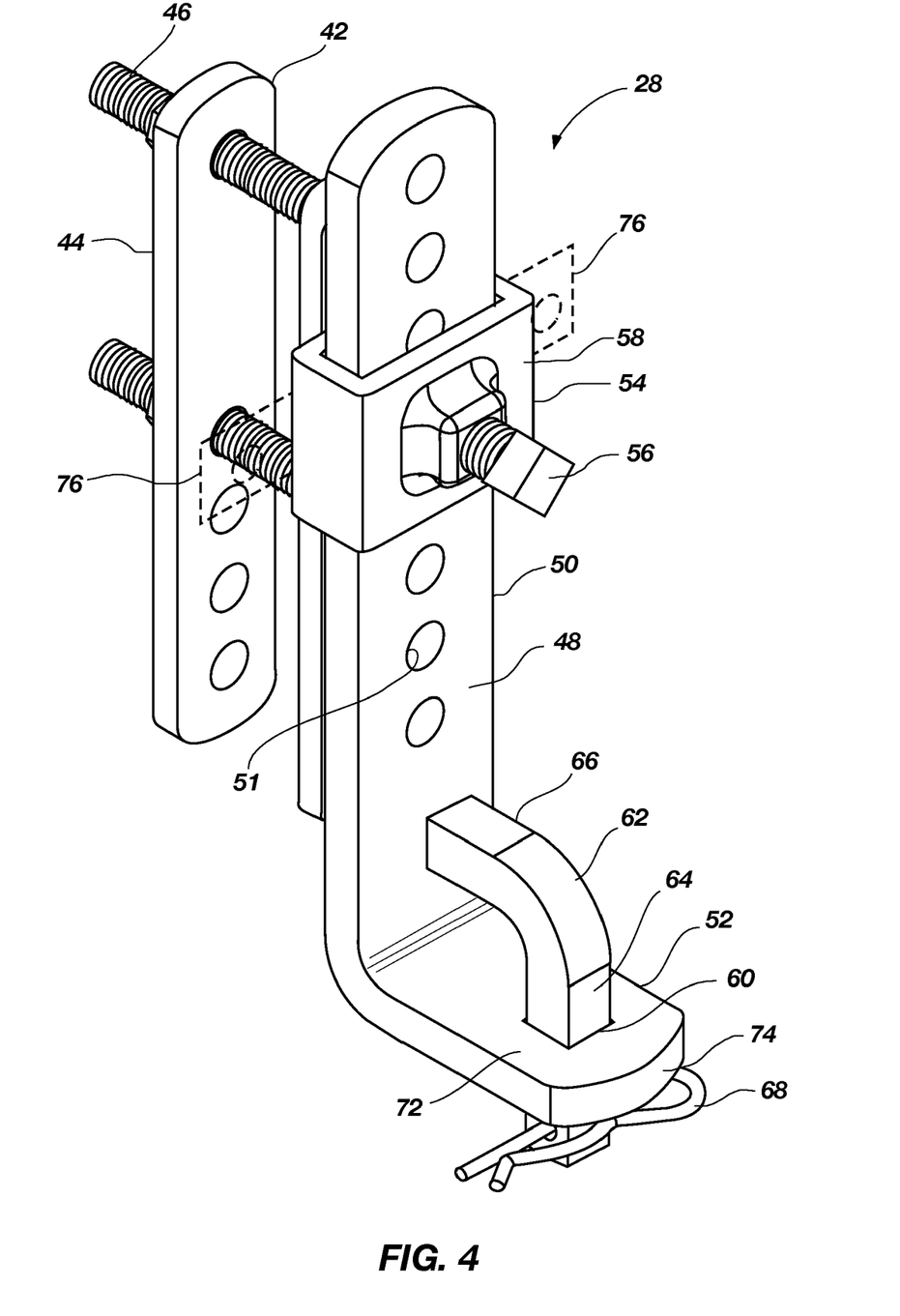
FIG. 4 is a perspective view of a bracket for joining a spring bar to the trailer tongue.

Brackets 28 may be provided to join the spring bars 26 to the trailer tongue 16, as shown most clearly in FIGS. 2 and 3. A perspective view of one embodiment of the brackets 28 is shown in FIG. 4. The brackets 28 may include an attachment portion 42 comprising a fastening mechanism for attaching the brackets 28 to the trailer tongue 16. The attachment portion 42 may include one or more attachment members 44 and one or more fasteners 46 for joining the attachment members 44 to the trailer tongue 16. The attachment members 44 may be formed as bars or plates, for example, or any other suitable shaped structure. It will be understood that one embodiment of the present disclosure may include two fasteners 46 that may be configured and arranged to extend on the top and bottom of the trailer tongue 16 to join the bracket 28 to the trailer tongue 16. Alternatively, the fasteners 46 may be received in openings in the trailer tongue 16 for joining the bracket 28 to the trailer tongue 16.

The bracket 28 may also include a support 48 for supporting the spring bar 26. One embodiment of the support 48 may be formed of a rigid member having a substantially "L" shaped configuration. The support may include an upward extending portion 50 for being attached to the attachment portion 42, and a lateral extending portion 52 for receiving the spring arm 26 thereupon. The upward extending portion 50 may include one or more openings 51 for adjustably attaching the support 48 with respect to the attachment portion 42 in an upward and downward direction. The bracket 28 may also include an adjustment mechanism 54 for use in combination with the openings 51 for adjusting a position of the support 48 with respect to the attachment portion 42, and holding the support 48 in place with respect to the attachment portion 42.

The adjustment mechanism 54 may include a fastening member 56, such as a bolt, rod, pin, clip, or any other suitable device, that may be receivable in the openings 51 to allow the support 48 to be releasably joined to the attachment portion 42. The adjustment mechanism 54 may also include a support receiver 58 for receiving the upward extending portion 50 of the support 48 such that the support 48 may be moved with respect to the receiver 58 as the support 48 slides up and down in the receiver 58. One embodiment of the receiver 58 may be fixedly joined to the attachment portion 42 such that attachment of the support 48 to the receiver 58 may serve to fix the support 48 to the attachment portion 42. It will be understood that the fastening member 56 may be aligned with one of the openings 51 such that the fastening member 56 may be introduced into the opening 51. One embodiment of the present disclosure may include threads on the fastening member 56 and the receiver 58 such that the fastening member 56 may be rotated to move into and out of the openings 51. Moreover, the threads may serve to hold the fastening member 56 in place. It will be understood, however, that other embodiments of the present disclosure may be formed with alternative attachment mechanisms not utilizing threads.

One embodiment of the support 48 may include an opening 60 in the lateral extending portion 52. A stud 62 may be received in the opening 60 for holding the spring bar 26 on the lateral extending portion 52. One embodiment of the stud 62 may have a somewhat "L" shape, including a post 64 for being received in the opening 60, and a rail portion 66 for extending over an upper surface of the spring bar 26 to prevent the spring bar 26 from moving off of the lateral extending portion 52 of the support 48. The stud 62 may be secured to the support 48 using a clip 68 or any other suitable fastening mechanism. It will be understood that the stud 62 and the support 48 may surround the spring bar 26 to hold the spring bar 26 on the support 48.

It will be understood that the bracket 28 may be joined to the trailer tongue 16 using alternative mechanisms, such as tabs, as shown in dashed lines at 76, and fasteners. Moreover, the bracket 28 may have various different configurations in accordance with the principles of the present disclosure.

Figure 5:
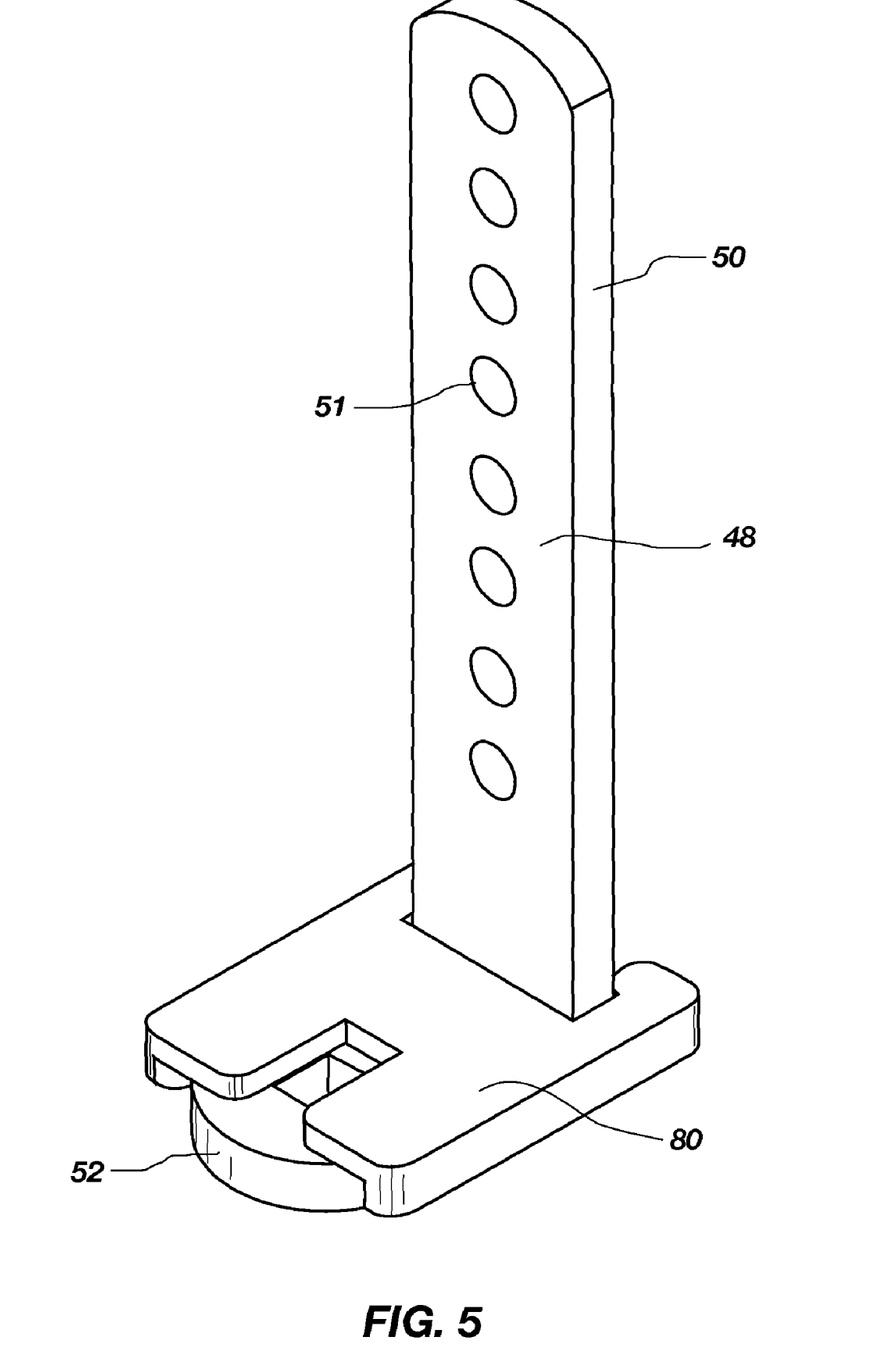
FIG. 5 is a perspective view of one embodiment of a spring bar support and jacket.

Referring now to FIG. 5, a perspective view is shown of a support 48 having a jacket 80 joined to the lateral extending portion 52. The jacket 80 may be formed of various different materials configured for altering frictional characteristics of the contact between the spring bars 26 and the support 48. For example, the jacket 80 may be formed of neoprene, high density polyethylene, various different types of metal such as steel or brake pads, or any other suitable material known in the art. Accordingly, the frictional characteristics of the support 48 may be altered by joining the jacket to the support 48, to either increase or decrease the frictional resistance between the support 48 and the spring bars 26. For example, if additional sway control is desired, a jacket 80 having a higher coefficient of friction may be joined to the support 48. Similarly, if reduced friction is desired, in cases where increased maneuverability is desired or a reduction in shearing noise or forces is desired, a jacket 80 having a lower coefficient of friction may be joined to the support 48. Jackets 80 having a wide variety of coefficients of friction may be provided within the scope of the present disclosure.

It will be understood that the jacket 80 may also be utilized to control the wear on the support 48. For example, since the jacket 80 may be removable from the support 48, the jacket 80 may be subjected to wear rather than the support 48. If the jacket 80 becomes excessively worn, the jacket 80 may be replaced without the need for replacing the entire support 48 or bracket 28. Accordingly, wear caused by the spring bar 26 may be confined to the jacket 80, which may be easily removed and replaced. It will be understood, however, that alternative embodiments of the jacket may be permanently, or substantially permanently, attached to the support 48.

Figure 6:
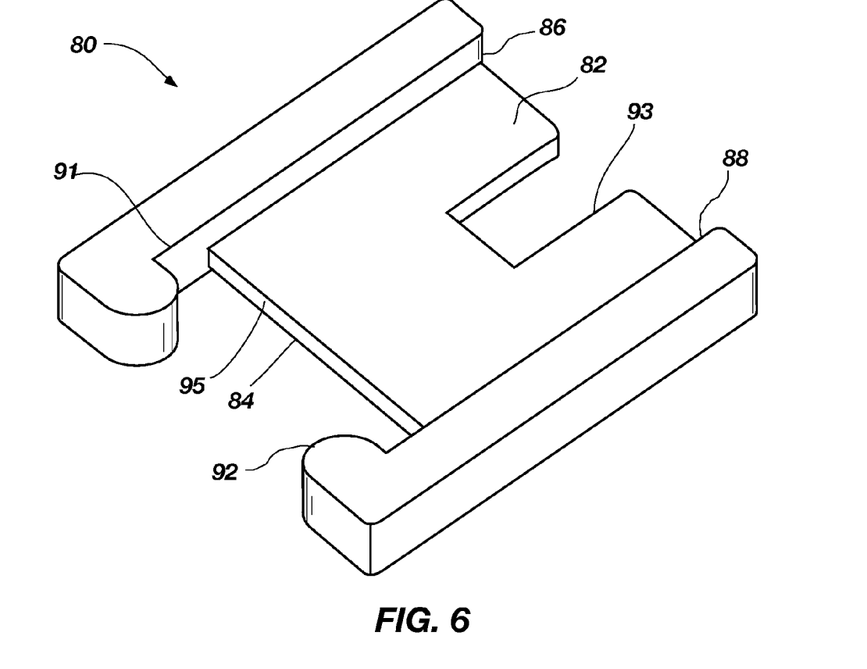
FIG. 6 is a bottom perspective view of one embodiment of a jacket.

As shown in FIG. 6, which depicts a perspective view of the underside of the jacket 80, the jacket 80 may include a socket 82 for receiving a portion of the bracket 28, such as the lateral extending portion 52 of the support 48. The socket 82 may be defined at least in part by a top wall 84, a first side wall 86 and a second side wall 88. A contact surface 90 may be formed on an upper surface of the top wall 84, as shown most clearly in FIG. 7, which depicts a perspective view of the upper side of the jacket 80. The contact surface 90 may be configured for contacting the spring bar 26 for altering movement of the spring bar 26 with respect to the bracket 28, as compared to movement of the spring bar 26 with respect to the bracket 28 without the jacket 80.

Figure 7:
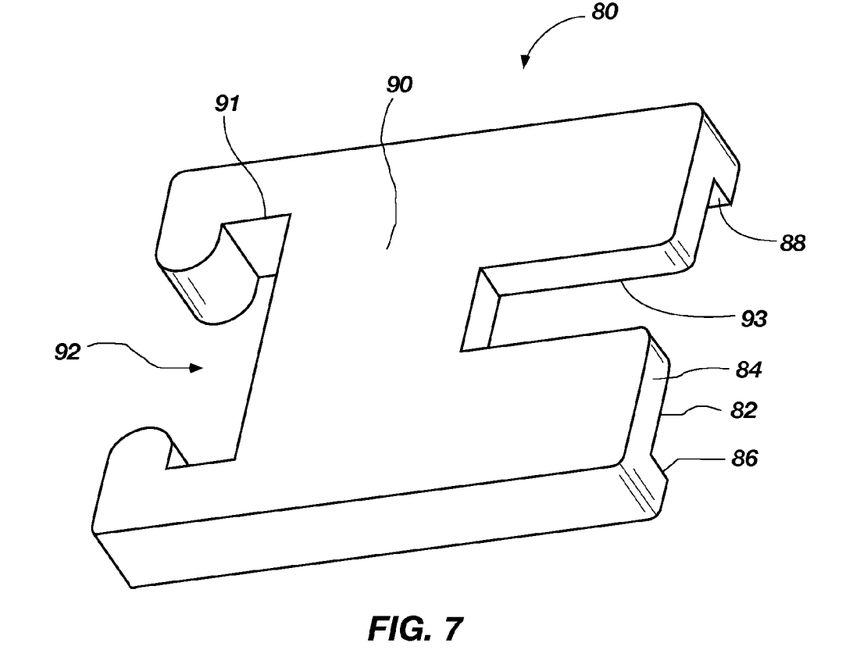
FIG. 7 is an upper perspective view of the jacket of FIG. 6.

One embodiment of the jacket 80 may include the top wall 84 having a thickness from the upper surface to the lower surface that is less than, or approximately half, the thickness of the jacket 80 at the first side wall 86 and the second side wall 88. It will be understood that other embodiments of the jacket 80 may have different dimensions and proportions.

The jacket 80 may also include an opening 91 for introducing the support 48 of the bracket 28 into the socket 82. One or more stops 92 may be formed on the jacket for preventing the jacket 80 from falling off of the bracket 28. One embodiment of the jacket 80 may include two stops 92, each stop 92 being positioned on opposite sides of the jacket 80, adjacent to the opening 91. It will be understood, however, that alternative embodiments of the jacket 80 may include a single continuous stop extending the width of the jacket 80, or the stop may be formed in other different configurations within the scope of the present disclosure.

It will be understood that the jacket 80 may be installed on the support 48 of the bracket 28 by orienting the jacket 80 substantially parallel to the upward extending portion 50 of the support 48. The lateral extending portion 52 of the support 48 may then be introduced into the opening 91 and the jacket 80 may be moved toward the upward extending portion 50. Once the jacket 80 is adjacent to the upward extending portion 50 of the support 48, the jacket 80 may be rotated to reside atop the lateral extending portion 52, as depicted in FIG. 5. The stops 92 may then extend on a backside of the upward extending portion 50 to prevent the jacket 80 from being moved away from the support 48. It will be understood that the top wall 84 of the jacket 80 may rest upon the lateral extending portion 52 of the support 48, and lateral movement of the jacket 80 may be prevented by abutment of the lateral extending portion 52 with the first side wall 86 and the second side wall 88 of the jacket 80. The jacket 80 may be allowed to move upwardly with respect to the support 48 as the upward extending portion 50 may be received in the opening 91.

Removal of the jacket 80 from the support 48 may be accomplished using steps opposite to those described above. The jacket 80 may be rotated such that the stops 92 are positioned underneath the lateral extending portion 52 of the support 48 and the jacket 80 is substantially parallel with the upward extending portion 50 of the support 48. Then the jacket 80 may be moved away from the upward extending portion 50 until the jacket 80 is separated from the support 48. It will be understood that the jacket 80 may be easily and quickly installed and removed from the support 48 without the need for removing the support 48 from the remainder of the bracket 28, or the trailer tongue 16.

One embodiment of the jacket 80 may include a slot 93 for aligning with the opening 60 in the lateral extending portion 52, and for receiving the stud 62 therethrough for attaching the spring bar 26 to the support 48. The slot 93 may extend through the top wall 84 and may be sized and shaped to correspond to the opening 60 in the lateral extending portion 52. It will be understood that the stud 62 may be passed through the slot 93 and the opening 60 for holding the spring bar 26 on the lateral extending portion 52 of the support 48.

One embodiment of the jacket 80 may include a tapered edge 95 on the top wall 84. The tapered edge 95 may facilitate rotation of the jacket 80 with respect to the lateral extending portion 52, to facilitate installing and removing the jacket 80 on the support 48. Other embodiments may be formed without the tapered edge 95.

Figure 8:
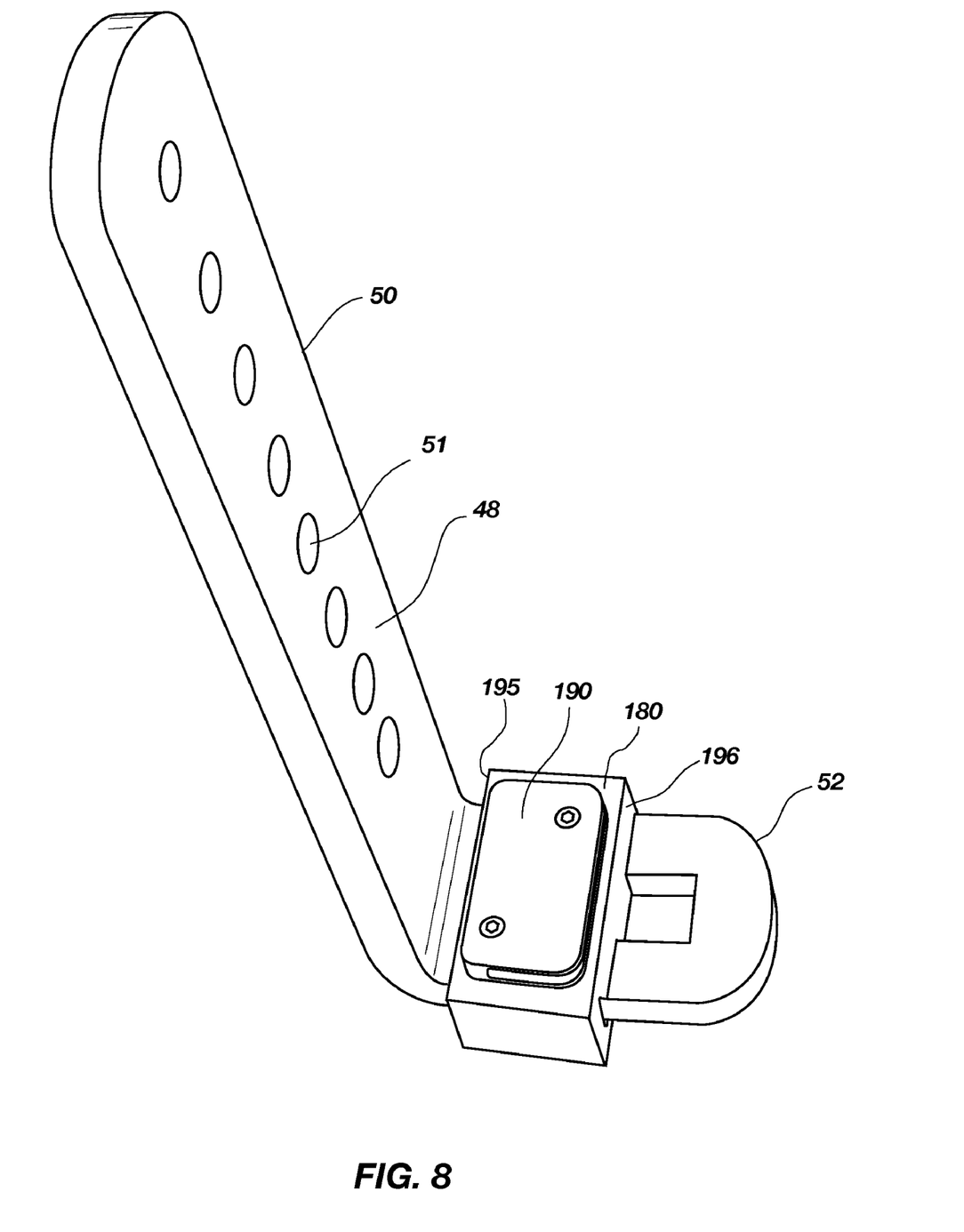
FIG. 8 is a perspective view of a support with an alternative embodiment jacket.
Figure 9:
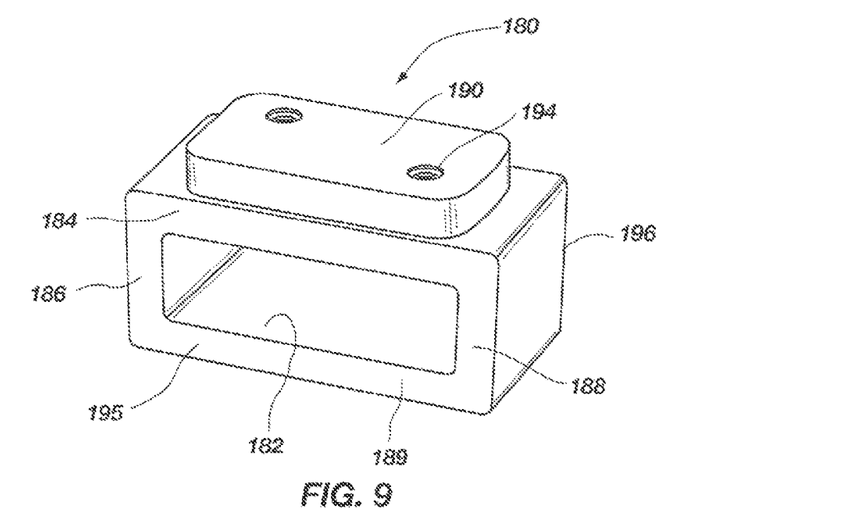
FIG. 9 is a perspective view of the jacket of FIG. 8.

Reference will now to made to FIGS. 8 and 9 to describe a second embodiment of the present disclosure. As previously discussed, the presently disclosed embodiments illustrated herein are merely exemplary of the possible embodiments of the disclosure, including that illustrated in FIGS. 8 and 9.

It will be appreciated that the second embodiment of the disclosure illustrated in FIGS. 8 and 9 contains many of the same structures represented in FIGS. 1-7 and primarily the new or different structures will be described to most succinctly explain the additional advantages that come with the embodiments of the disclosure illustrated in FIGS. 8 and 9. The second embodiment of the disclosure includes a jacket 180 having a socket 182 defined by a top wall 184, a first side wall 186, a second side wall 188 and a bottom wall 189, as shown most clearly in FIG. 9. Accordingly, the socket 182 may be configured to circumscribe the lateral extending portion 52 of the support 48. The jacket 180 may include a contact surface 190 that may include a fixed or removable portion configured for contacting the spring bar 26. For example, fasteners 194 may be used to attach a material having desired frictional properties to the top wall 184. Accordingly, the contact surface 190 may be formed of various different materials, such as brake pads, metal, synthetic materials, and the like, to either increase or decrease the friction between the bracket 28 and the spring bar 26. Moreover, the contact surface 190 may be configured to cover only a portion of the top wall 184, or the entire top wall 184.

It will be understood that other embodiments may include the contact surface 190 permanently joined to the top wall 184, such as by welding, adhesives, or the like. Alternatively, the contact surface 190 may be integrally formed with the top wall 184. Accordingly, the contact surface 190 may be formed of the same material as the top wall 184, or the contact surface 190 may be formed of a material that is different from the material forming the top wall 184.

One embodiment of the jacket 180 may be sized to fit between the opening 60 on the lateral extending portion 52 of the support 48 and the upward extending portion 50 of the support 48. A first end 195 of the jacket 180 may be configured for contacting the upward extending portion 50 of the support 48, and a second end 196 of the jacket 180 may be configured for contacting the stud 62, such that the jacket 180 may be secured to the support 48.

Figure 10:
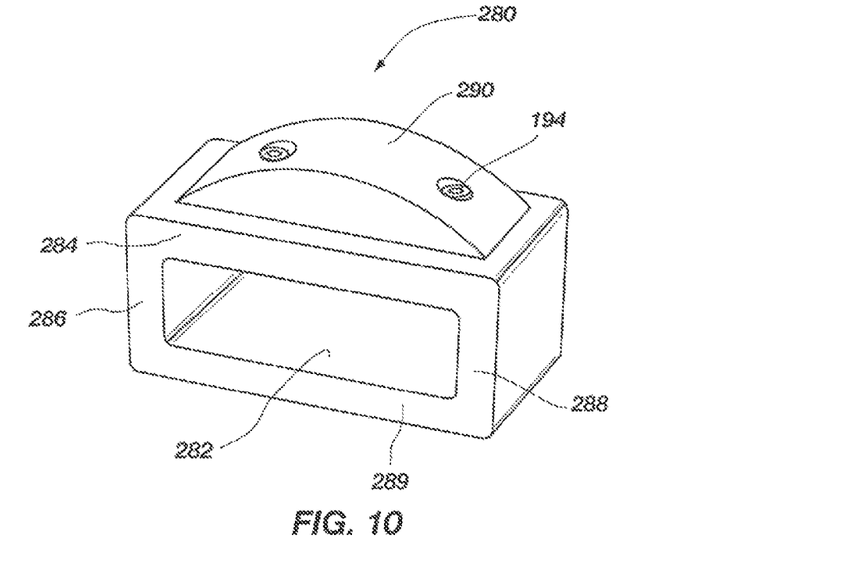
FIG. 10 is an end view of an alternative embodiment jacket.

Reference will now to made to FIG. 10 to describe an additional embodiment of the present disclosure. As previously discussed, the presently disclosed embodiments illustrated herein are merely exemplary of the possible embodiments of the disclosure, including that illustrated in FIG. 10.

It will be appreciated that the embodiment of the disclosure illustrated in FIG. 10 contains many of the same structures represented in FIGS. 1-9 and primarily the new or different structures will be described to most succinctly explain the additional advantages which come with the embodiments of the disclosure illustrated in FIG. 10. The embodiment of the disclosure in FIG. 10 includes a jacket 280 that may be similar to the embodiment of FIGS. 8 and 9, having a socket 282, top wall 284, first side wall 286, second side wall 288 and bottom wall 289. However, the jacket 280 may have a contact surface 290 that may include a non-planar configuration.

Figure 11:
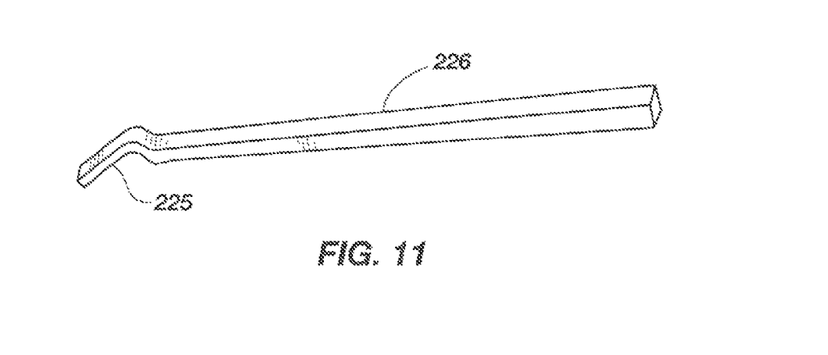
FIG. 11 is a perspective view of an alternative embodiment spring bar useful with the jacket of FIG. 10.

One embodiment of the contact surface 290 may have a convex configuration that may correspond to a concave configuration 225 formed in the spring bar 226, as shown in FIG. 11. It will be appreciated that the spring bar 226 shown in FIG. 11 is for exemplary purposes and various different configurations in the spring bar 226 may be used. It will be understood that the contact surface 290 may form a cam to interact with the spring bar 226 to bias the spring bar 226 to a neutral position in which the contact surface 290 mates with the corresponding configuration 225 in the spring bar 226. It will be understood that the contact surface 290 may have various different shapes and configurations within the scope of the present disclosure. Moreover, the contact surface 290 may be formed separately from, or integrally with, the top wall 284, and the contact surface 290 may be formed of various different materials. Additionally, it will be understood that the non-planar surface may be used with the embodiment of the jacket 80 as depicted in FIGS. 6 and 7. Accordingly, it will be understood that the jacket 280 may provide for improved versatility, as various different jackets may be usable with the bracket 28 to be compatible with various different types and configurations of spring bars 226.

It will be understood that the structures disclosed herein may be manufactured using techniques and equipment known to those skilled in the art. For example, the jacket may be formed using molding, casting, or milling techniques.

It will be appreciated that the structure and apparatus disclosed herein is merely one example of a means for removably attaching a jacket to a bracket, and it should be appreciated that any structure, apparatus or system for removably attaching a jacket to a bracket which performs functions the same as, or equivalent to, those disclosed herein are intended to fall within the scope of a means for removably attaching a jacket to a bracket, including those structures, apparatus or systems for removably attaching a jacket to a bracket which are presently known, or which may become available in the future. Anything which functions the same as, or equivalently to, a means for removably attaching a jacket to a bracket falls within the scope of this element.

It will be appreciated that the structure and apparatus disclosed herein is merely one example of a means for altering movement of a spring bar with respect to a bracket, and it should be appreciated that any structure, apparatus or system for altering movement of a spring bar with respect to a bracket which performs functions the same as, or equivalent to, those disclosed herein are intended to fall within the scope of a means for altering movement of a spring bar with respect to a bracket, including those structures, apparatus or systems for altering movement of a spring bar with respect to a bracket which are presently known, or which may become available in the future. Anything which functions the same as, or equivalent to, a means for altering movement of a spring bar with respect to a bracket falls within the scope of this element.

In accordance with the features and combinations described above, a useful method of altering movement of a spring bar with respect to a bracket includes the steps of:

(a) providing a support portion of the bracket having a lateral extending portion for supporting the spring bar thereupon;

(b) removably joining a jacket to the lateral extending portion, wherein the jacket has a contact surface having a different friction coefficient or shape as compared to the lateral extending portion of the support.

Those having ordinary skill in the relevant art will appreciate the advantages provide by the features of the present disclosure. For example, it is a feature of the present disclosure to provide a jacket for a trailer hitch bracket that is simple in design and manufacture. Another feature of the present disclosure is to provide such a jacket that alters movement of a spring bar with respect to the bracket. It is a further feature of the present disclosure, in accordance with one aspect thereof, to provide a jacket that can be removably attached to the bracket to either increase or decrease the friction between the bracket and the spring bar. It is an additional feature of the present disclosure to provide a mechanism for controlling wear on a trailer hitch bracket. It is another feature of the present disclosure to provide a removable wear surface that can be replaced without the need for replacing the entire bracket.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for attaching to a trailer hitch system, said trailer hitch system comprising a spring bar for equalizing trailer loads and reducing trailer sway, said apparatus comprising:
    a jacket for being removably attachable to a bracket for joining said spring bar to a trailer tongue, said jacket comprising:
        a socket for receiving a portion of said bracket, said socket defined at least in part by a top wall, a first side wall and a second side wall;
        a contact surface formed on an upper surface of said top wall, said contact surface configured for contacting said spring bar;
        an opening for introducing said bracket into said socket; and
        a slot formed in said top wall for aligning with an opening in said bracket for receiving a stud for holding said spring bar On said bracket;
    wherein said contact surface is configured for altering movement of said spring bar with respect to said bracket;
    said apparatus further comprising at least one stop for holding the jacket on the bracket;
    wherein said opening of said jacket is defined between said first side wall and said second side wall;
    wherein said at least one stop comprises a first stop and a second stop positioned on opposite sides of said jacket adjacent to said opening of said jacket, said first stop projecting from said first side wall towards said second side wall, and said second stop projecting from said second side wall towards said first side wall;
    wherein said slot starting on an end of said top wall of said jacket opposite said opening of said jacket and extending toward and above an opening of said bracket;
    wherein said top wall comprises a thickness from said upper surface of said too wall to a lower surface of said top wall, wherein said thickness of said top wall is less than a thickness of said jacket at said first side wall and said second side wall;
    wherein said top wall comprises a tapered edge at an end of said top wall adjacent to said opening of said jacket.

2. The apparatus of claim 1, wherein said at least one stop for holding the jacket on the bracket.

3. The apparatus of claim 1, further comprising a bottom wall.

4. The apparatus of claim 1, wherein said contact surface is removably attachable to said top wall.

5. The apparatus of claim 1, wherein said contact surface has a non-planar configuration.

6. The apparatus of claim 1, further comprising a support having an upward extending portion and a lateral extending portion, said lateral extending portion being receivable in said socket.

7. The apparatus of claim 1,
    wherein the jacket comprises means for altering movement of said spring bar with respect to said bracket.

8. The apparatus of claim 7, wherein said means for altering movement of said spring bar with respect to said bracket comprises one of a group consisting of a material having a different coefficient of friction as compared to said bracket and a non-planar surface.

* * * * *